US005453100A

United States Patent [19]

Sieloff

[11] Patent Number: 5,453,100

[45] Date of Patent: Sep. 26, 1995

[54] METHOD FOR COLOR DYEING POLYCARBONATE

[75] Inventor: Ronald F. Sieloff, Evansville, Ind.

[73] Assignee: General Electric Company, Mt. Vernon, Ind.

[21] Appl. No.: 259,415

[22] Filed: Jun. 14, 1994

[51] Int. Cl.$^{6}$ .......................... D06P 5/00

[52] U.S. Cl. .......................... 8/479; 8/506; 8/512; 8/609; 8/611; 8/637.1; 427/163.1; 427/164; 427/169; 427/162

[58] Field of Search .......................... 8/479, 506, 512, 8/609, 611, 637.1; 427/163, 164, 169, 163.1, 162

[56] References Cited

U.S. PATENT DOCUMENTS 4,377,389 3/1983 Haddad et al. .......................... 8/506

*Primary Examiner*—Paul Lieberman

*Assistant Examiner*—Margaret Einsmann

[57] ABSTRACT

Polycarbonate materials are dyed by immersion into a mixture of dye or pigment dissolved in a solvent blend. The blend is made up of an impregnating solvent, which attacks the polycarbonate and allows impregnation of the dye or pigment, and a moderating solvent which reduces the aggressiveness of the impregnating solvent. A graded tint is provided by slowly withdrawing the immersed polycarbonate material from the mixture. Polycarbonate materials having a graded tint, especially sheets in the form of lenses and goggles, are also provided.

20 Claims, No Drawings

METHOD FOR COLOR DYEING POLYCARBONATE

FIELD OF THE INVENTION

The present invention relates to a method for color-dyeing polycarbonate, and particularly, for color-dyeing a polycarbonate sheet by immersion in a moderated solvent dye mixture. The method is especially useful in the manufacture of tinted lenses. The present invention also relates to the resulting color-dyed polycarbonate and polycarbonate sheets and lenses.

BACKGROUND OF THE INVENTION

Color-tinted lenses have been developed for goggles and glasses to reduce light transmission and to mitigate glare. In certain sports,-such as skiing and snowboarding, glare reduction is especially desirable. Lenses with a graded tint have been found to reduce glare also, and are especially useful for sports which require a clear view of proximal terrain and objects yet a reduced glare when viewing distant terrain or objects.

Polycarbonate is a useful lens material for sports goggles and glasses because it is strong, durable and lightweight; however, it is not necessarily highly mar-resistant. Polycarbonate may be compounded with a dye, for example a fabric dye, so as to exhibit a uniform color tint when formed into a film. Unfortunately, this process does not lend itself to achieving a graded tint in the polycarbonate medium.

In order to impart mar-resistance to a polycarbonate lens, formable mar-resistant protective coatings, e.g., melamine formaldehyde, have been employed. Melamine formaldehyde coatings have the advantage that they can be formed with a graded tint, although with some difficulty. Unfortunately, such coatings made of melamine formaldehyde are not chemically durable when exposed to some lens cleaning and other chemical agents.

There have been developed more chemically durable and inert mar-resistant coatings for polycarbonate. Unfortunately, because they are so chemically inert, no practical methods have been developed to color-dye those coatings, especially to provide a graded tint.

It is therefore desirable to provide a method of forming a tinted polycarbonate lens for glasses or goggles, and especially such a lens with a graded tint. Such a lens may, in addition, be coated with a highly mar-resistant chemically inert clear coating.

SUMMARY OF THE INVENTION

The present invention is based upon the discovery that polycarbonate may be color-tinted by immersion into a mixture of a dye or pigment in a solvent blend. Alternatively, the polycarbonate may be coated with a coloring dye and solvent mixture according to the present invention and thereafter dried in an oven. The solvent blend attacks the polycarbonate and enables the dye or pigment to be impregnated within the polycarbonate material.

According to one embodiment of the present invention, a polycarbonate material, particularly a polycarbonate sheet, is immersed in the mixture and is then slowly withdrawn therefrom. The portion of the sheet which remains in the mixture longest is impregnated with the most dye or pigment and consequently exhibits the darkest color tint. In accordance with the present invention, a lens for glasses or goggles formed of a polycarbonate sheet material may be manufactured with a graded tint. Also, by withdrawing different parts of the lens from the mixture at different times, other tint gradients can be produced. For example, by rotating a sheet of polycarbonate as it is withdrawn from the mixture, a color gradient along a curve can be achieved.

According to another embodiment of the present invention, the solvent blend comprises an impregnating solvent and a moderating solvent. The impregnating solvent attacks the polycarbonate and enables impregnation of the dye or pigment. The moderating solvent acts as a diluent and wetting agent and reduces the aggressiveness of the impregnating solvent. The solvent blend may contain between 5 and 90 percent by weight impregnating solvent and between 10 and 95 percent by weight moderating solvent. At certain levels of impregnating solvent in the blends, polycarbonate lenses can be color tinted without affecting optical clarity. A sufficient amount of dye or pigment is combined with the solvent blend to tint the polycarbonate material immersed in the mixture. Also, it is preferable in some cases to heat the mixture to improve impregnation. The temperature of the mixture should be maintained below the glass transition temperature of polycarbonate (approximately 150° C.) and preferably below 120° C.

The present invention also provides a color-dyed polycarbonate material, and more particularly, a color-dyed polycarbonate sheet which can be used as a lens having a graded tint.

DETAILED DESCRIPTION OF THE INVENTION

According to an embodiment of the present invention, polycarbonate material is immersed in a mixture comprising two solvents and a dye or pigment. The dye or pigment is present in an amount sufficient to color tint the polycarbonate material. The solvent blend preferably contains an impregnating solvent which attacks the polycarbonate and a moderating solvent which reduces the aggressiveness of the impregnating solvent and provides good wet-out characteristics. To reduce processing time, while keeping evaporation losses to a minimum, some mixtures can be heated to elevated temperatures below 120° C.

The impregnating solvent may include at least one solvent selected from dipropylene glycol monomethyl ether (DPM) and tripropylene glycol monomethyl ether (TPM), and propylene glycol monomethyl ether (PM). The impregnating solvents are aggressive polycarbonate solvents. Used at full strength, these impregnating solvents attack polycarbonate materials and easily form microcracks therein, which tend to propagate and cause greater cracking.

To prevent the impregnating solvent from attacking the polycarbonate sheet too aggressively, a moderating solvent is blended with the impregnating solvent. Exemplary moderating solvents include propylene glycol (PG), 1,4 butane diol, and ethylene glycol monobutyl ether (EB).

It is preferable to combine an impregnating solvent with a physically compatible and matched moderating solvent. For example, it is preferable to employ a blend of solvents with similar evaporation characteristics. One preferred moderating solvent for use with the impregnating solvent DPM is propylene glycol. A suitable and preferred moderating solvent to be used with TPM is 1,4 butane diol. Other blends may also be used which comprise more than one impregnating solvent or more than one moderating solvent.

Matched blends of DPM/PG are preferred solvent blends because of the low-temperature solubility of so many dyes in such blends. Blends of TPM/1,4 butane diol are also useful but must be heated to higher temperatures than the DPM/PG blends to solubilize many dyes and pigments, and some do not become soluble at all in the blend. Also, the use of higher temperatures (near 120° C. and above) is undesirable as discussed above because those temperatures are near the glass transition temperature of polycarbonate. In order to minimize the possibility of melting or softening the polycarbonate, it is desirable to maintain the temperature of the blend well below 150° C., preferably below 120° C., and even more preferably at about 100° C.

The moderating solvent is preferably selected so as to exhibit evaporation characteristics close to those of the impregnating solvent with which it is blended. Similar evaporation characteristics are desired because a moderating solvent that is much more volatile than the impregnating solvent it is blended with may evaporate too quickly and cause the composition of the mixture to continually change as the more volatile moderating solvent evaporates. When impregnating solvents and moderating solvents are matched so as to have similar evaporation characteristics, the resultant mixture maintains a substantially constant composition and a substantially constant concentration of each solvent.

The moderating solvent should not only reduce the aggressiveness of the impregnating solvent, but it should also cause a good wet-out of the mixture on a polycarbonate surface such that a uniformly thick layer of mixture can be coated onto, e.g., a polycarbonate sheet. Moderating solvents having good wet-out characteristics minimize the tendency of the heated mixture to bead-up on a polycarbonate surface when coating methods are used for application.

The mixture according to the present invention preferably contains a type of conventional dye or pigment that is known to be useful in compounding polycarbonate to form uniformly tinted polycarbonate materials. Fabric dyes, for example, can be used as polycarbonate-tinting dyes. The dyes useful for tinting polycarbonate are well known to those skilled in the art. The amount of dye used in the mixture can vary; however, only small amounts are typically needed to sufficiently tint a polycarbonate material. Greater amounts of dye, e.g., 10–50% by weight, can be used to provide an efficient dyeing process, and amounts of about 25% by weight have proven particularly effective.

One solvent blend used in the present invention preferably comprises between about 5 and about 90% by weight DPM and between about 10 and about 95% by weight PG. More preferably, the solvent blend comprises between about 40 and about 80% by weight DPM and between about 20 and about 60% by weight PG. Even more preferably, the solvent blend contains between about 60 and about 80% by weight DPM and between about 20 and about 40% PG. According to one embodiment of the present invention, the solvent blend contains about 70% by weight DPM and about 30% by weight PG.

In a preferred embodiment, a dye or pigment, suitable for compounding with polycarbonate materials, is mixed with a solvent blend comprising an impregnating solvent and a moderating solvent to form a mixture, said impregnating solvent comprising at least one member selected from the group consisting of dipropylene glycol monomethyl either (DPM), tripropylene glycol monomethyl ether (TPM), and propylene glycol monomethyl ether. A polycarbonate sheet is coated with said mixture to form a coated material and the coated material is dried bay heating the material in an oven at a temperature of about 200° F.

In another embodiment of the present invention, the mixture contains a conventional dye or pigment as described above and a solvent blend comprising TPM and 1,4 butane diol. According to this embodiment, the solvent blend preferably comprises between about 5 and about 90% by weight TPM and between about 10 and about 95% by weight 1,4 butane diol. More preferably, the solvent blend comprises between about 40 and about 80% by weight TPM and between about 20 and about 60% by weight 1,4 butane diol. Even more preferably, the solvent blend comprises between about 60 and about 80% by weight TPM and between about 20 and about 40% by weight 1,4 butane diol. According to one embodiment, the solvent blend contains about 70% by weight TPM and about 30% by weight 1,4 butane diol.

In yet another embodiment of the present invention, the mixture contains a conventional dye or pigment as described above and a solvent blend comprising ethylene glycol monobutyl ether (EB) and propylene glycol monomethyl ether (PM). The solvent blend preferably comprises between about 5 and about 90% by weight PM and between about 10 and about 95% by weight EB. More preferably, the solvent blend comprises between about 40 and about 80% by weight PM and between about 20 and about 60% by weight EB. Even more preferably, the solvent blend comprises between about 60 and about 80% by weight PM and between about 20 and about 40% by weight EB. According to one embodiment, the solvent blend comprises about 70% by weight PM and about 30% by weight EB.

To minimize processing time, the solvent systems may sometimes be used at elevated temperatures below 120° C. However, due to the aggressive nature of the PM/EB solvent paired system, this system is normally used at temperatures between about 20 and about 30° C. The use of temperatures near 100° C would cause immediate attack of the polycarbonate substrate and render a hazed appearance to the object.

Likewise, ratios of DPM/PG or TPM/1,4 butane diol in excess of 70z30 should not be used at a 110°–120° C. processing range.

The molecular weight of the polycarbonate, additive packages to the polycarbonate resin package, and the chemical nature of the dye all influence the exact temperature that yields optimum results for a given solvent package. Solvent ratios and operation temperatures are best selected by processing the solvent mixture without any dye present. Temperature and solvent ratios are then selected so as to be just below conditions that yield noticeable attack of the polycarbonate system. If the mixture is applied via coating and drying instead of by dip methods, the temperature of the polycarbonate also plays an important role in determining optimum conditions in that latent heat within the polycarbonate object may seriously affect the solvent temperature referred to above.

In accordance with the invention, a polycarbonate material is immersed in a solvent mixture and withdrawn after a only a few minutes to provide a resultant color tinted product. The length of time for which the polycarbonate material should remain immersed in the mixture depends upon the degree of tint desired. Controlling factors include: the concentration of impregnating solvent in the blend; the concentration of dye or pigment in the mixture; the thickness of the immersed material; and the temperature of the solvent mixture.

Higher concentrations of impregnating solvent, and higher temperatures can increase dye impregnation but may also result in too aggressive an attack on the polycarbonate material. Solvent blends having a high impregnating solvent concentration can cause the formation of microcracks in the polycarbonate material, which can propagate to form more visible cracks. More aggressive solvent blends also tend to cloud the resulting dyed product and should be avoided when light transmission through the material is essential. For example, when polycarbonate sheets are color-dyed for goggle lens applications it is very important to avoid clouding the lens material.

In order to impart a graded tint, the polycarbonate material is immersed in a solvent mixture according to the invention and may be slowly withdrawn from the mixture. The graded tint results because the portion of the material which remains in the mixture longest is impregnated with the most dye According to an alternative method of the present invention, a polycarbonate material, particularly a sheet material, can be flow-coated with a mixture according to the present invention. The flow-coated material is then dried in an oven for a length of time sufficient to evaporate the mixture and dry the material.

The present invention may be more fully understood with reference to the examples set forth below. The examples are in no way to be considered as limiting, but instead are provided as illustrative of the invention.

EXAMPLES

Example 1

25 g of fabric dye was added to 100 ml PG. The mixture was heated to boiling while being stirred. A sheet of polycarbonate was immersed in the mixture for five minutes. The sheet was then removed from the mixture, washed with water, and dried. No color was absorbed by the polycarbonate sheet.

Example 2

25 g of dye was added to a 100 ml blend comprising DPM and PG in a ratio of 70:30, respectively, based on weight percentages. The mixture was heated to 100° C. A polycarbonate sheet was then immersed in the heated mixture for three minutes. The sheet was then removed from the mixture, washed with water, and dried. Uniform color was retained.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. An improved method of tinting polycarbonate, comprising the steps of:

mixing a dye or pigment, suitable for compounding with polycarbonate, with a solvent blend immersing a polycarbonate material into said solvent blend and withdrawing said material from said mixture wherein the improvement comprises a solvent blend which comprises an impregnating solvent and a moderating solvent to form a mixture, said impregnating solvent comprising at least one member selected from the group consisting of dipropylene glycol monomethyl ether (DPM), tripropylene glycol monomethyl ether (TPM), and propylene glycol monomethyl ether (PM) wherein said moderating solvent is different from and physically compatible with said impregnating solvent and reduces the aggressiveness of said impregnating solvent and whereby said impregnating solvent attacks said polycarbonate material and said dye or pigment is impregnated into the material.

2. The method as claimed in claim 1, further comprising the step of heating said mixture to form a heated mixture before said immersing step.

3. The method as claimed in claim 1, wherein said step of withdrawing comprises withdrawing a first portion of the material from the mixture before withdrawing a second portion of the material therefrom.

4. A method as claimed in claim 1, wherein said impregnating solvent comprises dipropylene glycol monomethyl ether and said moderating solvent comprises propylene glycol.

5. A method as claimed in claim 4, wherein said blend comprises between about 5 and about 90% by weight dipropylene glycol monomethyl ether and between about 10 and about 95% by weight propylene glycol.

6. A method as claimed in claim 4, wherein said blend comprises between about 60 and about 80% by weight dipropylene glycol monomethyl ether and between about 20 and about 40% by weight propylene glycol.

7. A method as claimed in claim 4, wherein said blend comprises about 70% by weight dipropylene glycol monomethyl ether and about 30% by weight propylene glycol.

8. A method as claimed in claim 1, wherein said impregnating solvent comprises tripropylene glycol monomethyl ether and said moderating solvent comprises 1,4 butane diol.

9. A method as claimed in claim 8, wherein said blend comprises between about 5 and about 90% by weight tripropylene glycol monomethyl ether and between about 10 and about 95% by weight 1,4 butane diol.

10. A method as claimed in claim 8, wherein said blend comprises between about 60 and about 80% by weight tripropylene glycol monomethyl ether and between about 20 and about 40% by weight 1,4 butane diol.

11. A method as claimed in claim 8, wherein said blend comprises about 70% by weight tripropylene glycol monomethyl ether and about 30% by weight 1,4 butane diol.

12. A method as claimed in claim 1, wherein said impregnating solvent comprises propylene glycol monomethyl ether and said moderating solvent comprises ethylene glycol monobutyl ether.

13. A method as claimed in claim 12, wherein said blend comprises between about 5 and about 90% by weight propylene glycol monomethyl ether and between about 10 and about 95% by weight ethylene glycol monobutyl ether.

14. A method as claimed in claim 12, wherein said blend comprises between about 60 and about 80% by weight propylene glycol monomethyl ether and between about 20 and about 40% by weight ethylene glycol monobutyl ether.

15. A method as claimed in claim 12, wherein said blend comprises about 70% by weight propylene glycol monomethyl ether and about 30% by weight ethylene glycol monobutyl ether.

16. A method as claimed in claim 2, wherein said mixture is heated to a temperature of less than about 150° C.

17. A method as claimed in claim 1, wherein said polycarbonate material is a sheet of polycarbonate material.

18. An improved method of coloring polycarbonate, comprising the steps of:

mixing a dye or pigment, suitable for compounding with polycarbonate materials, with a solvent blend to form a mixture, coating a polycarbonate sheet with said mixture to form a coated material; and drying said coated material wherein the improvement comprises a solvent blend comprising an impregnating solvent selected from the group consisting of dipropylene glycol monomethyl ether (DPM), tripropylene glycol monomethyl ether and propylene glycol monomethyl ether and a moderating solvent different from and physically compatible with said impregnating solvent and which reduces the aggressiveness of said impregnating solvent whereby said impregnating solvent attacks said polycarbonate sheet and said dye or pigment is impregnated into the sheet.

19. A method as claimed in claim 18, further comprising the step of heating said mixture to form a heated mixture before said coating step.

20. A method as claimed in claim 18, wherein said step of drying comprises heating said material in an oven at a temperature of about 200° F.

* * * * *